US007975296B2

(12) United States Patent
Apfelbaum et al.

(10) Patent No.: US 7,975,296 B2
(45) Date of Patent: Jul. 5, 2011

(54) AUTOMATED SECURITY THREAT TESTING OF WEB PAGES

(75) Inventors: Larry Apfelbaum, W. Newton, MA (US); Henry Houh, Lexington, MA (US); Thomas Mayberry, Holliston, MA (US); George Friedman, Framingham, MA (US)

(73) Assignee: Oracle International Corporation, Redwood Shores ( * ) Notice: Subject to any disclaimer, the term of this patent is extended or adjusted under 35 U.S.C. 154(b) by 2447 days.

(21) Appl. No.: 10/360,572

(22) Filed: Feb. 6, 2003

(65) Prior Publication Data

US 2003/0159063 A1    Aug. 21, 2003

Related U.S. Application Data

(60) Provisional application No. 60/355,186, filed on Feb. 7, 2002, provisional application No. 60/397,524, filed on Jul. 22, 2002.

(51) Int. Cl.
*G08B 23/00* (2006.01)
*G06F 9/00* (2006.01)

(52) U.S. Cl. .......................................... 726/22; 726/25

(58) Field of Classification Search .................... 726/22, 726/25
See application file for complete search history.

(56) References Cited

U.S. PATENT DOCUMENTS

| 6,584,569 | B2 * | 6/2003 | Reshef et al. | 726/25 |
|---|---|---|---|---|
| 6,609,198 | B1 * | 8/2003 | Wood et al. | 713/155 |
| 6,987,853 | B2 * | 1/2006 | Uner | 380/44 |
| 6,996,845 | B1 * | 2/2006 | Hurst et al. | 726/25 |
| 2001/0034847 | A1 * | 10/2001 | Gaul, Jr. | 713/201 |
| 2003/0023873 | A1 * | 1/2003 | Ben-Itzhak | 713/201 |

FOREIGN PATENT DOCUMENTS

WO    WO 01 65330 A    9/2001

OTHER PUBLICATIONS

Redhat Inc., "Overview of Security Vulnerabilities in Apache httpd 1.3", Internet Citation, 2001, pp. 1-3.
G. Bahadur, et al., "Improving Apache", Information Security Magazine, Online, 2001, pp. 1-10.
Editor: "Readme: Tiger distribution", Internet Citation, Online, 1999, pp. 1-5.
International Search Report for PCT/US03/03672.

* cited by examiner

*Primary Examiner* — Kambiz Zand
*Assistant Examiner* — William S Powers

(57) ABSTRACT

A method of security testing a web application is presented. The method identifies a web application to be tested, determines potential security vulnerabilities of the web application, generates one or more security tests for testing the potential vulnerabilities, and executes the security test on the web application. The results of the security testing are then used to make the web application less vulnerable to security attacks.

20 Claims, 2 Drawing Sheets

AUTOMATED SECURITY THREAT TESTING OF WEB PAGES

CROSS REFERENCE TO RELATED APPLICATIONS

This application claims priority under 35 U.S.C. §119 (e) to provisional application Ser. No. 60/355,186 filed Feb. 7, 2002, and to provisional application Ser. No. 60/397,524 filed Jul. 22, 2002 the disclosures of which are hereby incorporated by reference.

STATEMENT REGARDING FEDERALLY SPONSORED RESEARCH

Not Applicable.

FIELD OF THE INVENTION

The present invention relates generally to the security of web pages and more specifically to a method of making web pages less vulnerable to security attacks.

BACKGROUND OF THE INVENTION

Security attacks of web applications are fairly common occurrences. A web application typically includes one or more web pages, and vulnerability on one web page can compromise the web application or even he web site running the web application. A web page may be vulnerable to many types of attacks.

Security testing of web applications is difficult and time consuming. Security of a web application is often times not specified as part of the application. Specifying security is very difficult, and implementing security measurements may not be correct. Security testing of a web application is also difficult. Furthermore, security testing of web applications requires extensive domain-specific knowledge. Also, new methods of breaking into web sites are found regularly, leading to the need to continuously track new security vulnerabilities.

One type of attack involves cookie stealing. Cookies are defined as small data files written to a user's hard drive by some web sites when the user views the website by way of a browser. These data files contain information the web site can use to track such things as passwords, lists of pages the user has visited, and the date when the user last looked at a certain page. The stealing of cookies can be used to gain access to a user's account on a web site or to provide information (such as credit card information) regarding the user. Once this information gets into the wrong hands, the attacker can access the web site and the user's information can be used by the attacker to perform a variety of tasks.

Another type of attack is known as a System Query Language (SQL) attack. Web applications typically use data from a user to construct SQL queries. In some instances a simply constructed query leads to a vulnerability wherein a user can execute arbitrary SQL queries against a database and acquire information such as passwords, social security numbers, credit cards numbers and the like.

An attack of a web site can be performed simply, by people who are generally non-technical. For example, it was recently reported that several Internet commerce sites using a particular shopping cart application were vulnerable. A user would enter the site and select items to purchase by placing them in to the application shopping cart. The user could then save the form to a local disk drive, edit the price in the form with a text editor then reload the form back into the web browser. The user would then purchase the items for the price entered by the user, instead of the actual price.

In view of the above, it would be desirable to have a method that provides testing and analysis of possible security threats to a web page so that appropriate action can be taken to make the web page less vulnerable to potential security attacks.

SUMMARY OF THE INVENTION

A method of security testing a web application is presented. The method identifies a web application to be tested, determines potential security vulnerabilities of the web application, generates a security test script for testing the potential vulnerabilities, and executes the security test script on the web application.. the results of the security tested are then used to make the web application less vulnerable to security attacks..

BRIEF DESCRIPTION OF THE DRAWINGS

The invention will be more fully understood from the following detailed description taken in conjunction with the accompanying drawings, in which.

DESCRIPTION OF THE INVENTION

The present invention comprises a method to determine potential security vulnerabilities in a web page, to then provide security attacks to the web page, and to record the attack results. By way of the present invention the recorded attack results are then analyzed and used to make the web page less vulnerable to attacks.

The owner of a web site may be concerned that the web site page response is vulnerable to hackers, user error or security threats. Security threats include cookie stealing, SQL attacks, script attacks and the like. A recent analysis of web application vulnerabilities indicated that the forty-five applications surveyed generating $3.5 billion in annual revenues had on average eleven security defects each. Many of these defects could have been caught earlier in the cycle, either by having a security design focus or in performing "Security Quality Assurance," which many companies do not perform.

Figure 1:
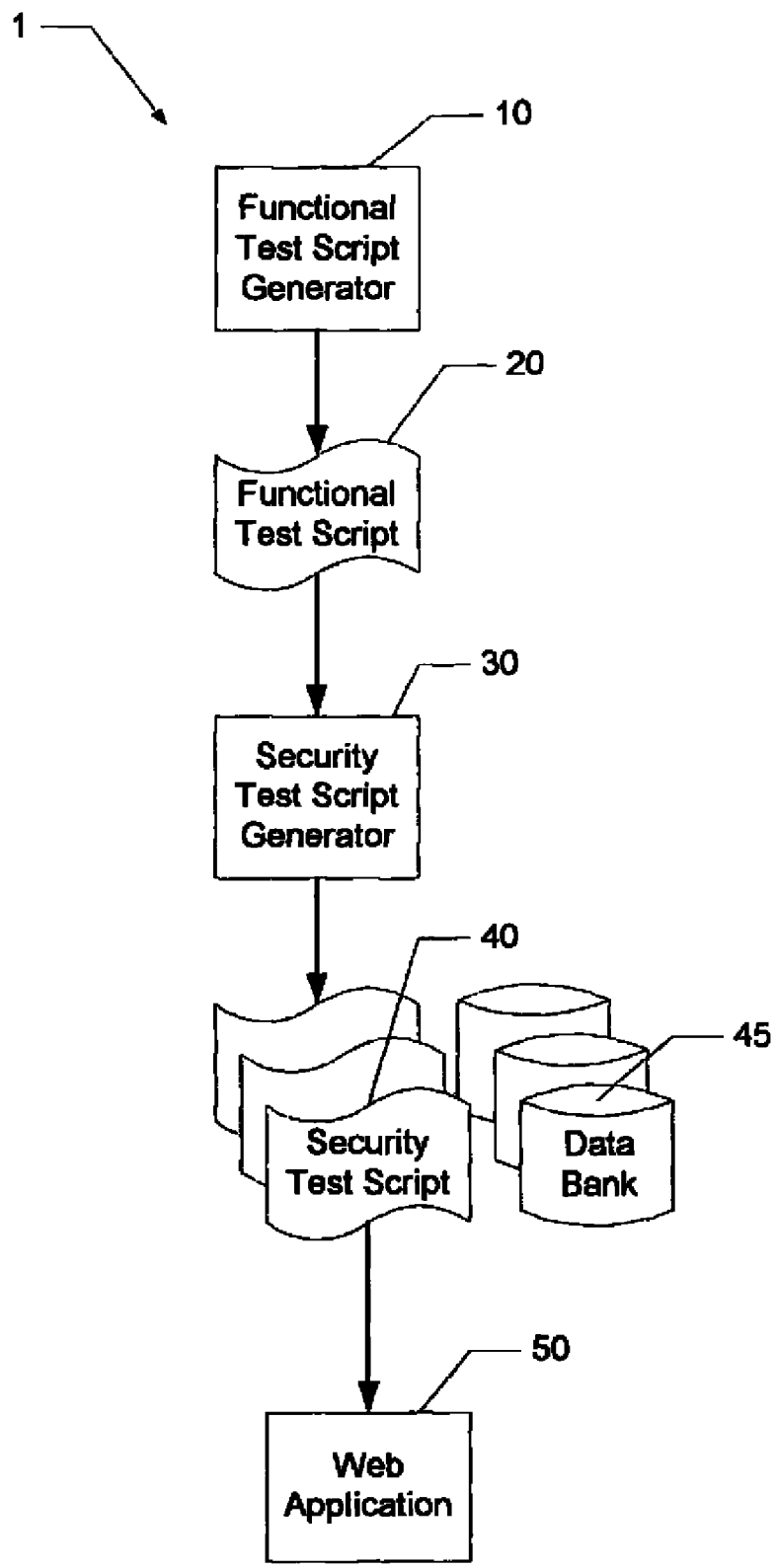
FIG. 1 is a block diagram of a system of the present invention.

Referring to FIG. 1, a block diagram 1 showing the components of the present invention and other components used to provide the automated generation of security test scripts for a web application. A Functional Test Script Generator 10 is used to provide a Functional Test Script 20. The functional test script generator 10 may be a test product such as E-Test™ available from Empirix Inc. of Waltham, Massachusetts. E-test™ generates one or more functional test scripts which access the web application 50 and simulate user interaction with the web application 50.

The functional test scripts 20 are provided to a Security Test Script Generator 30. The security test script generator 30 derives security test scripts 40 from the functional test scripts 20 to test potential vulnerabilities of the web application 50. A security test script is generated for each type of vulnerability. A security test script 40 may include a data bank 50 associated with the security test script 40.

The security test script 40 (and data bank 45) is then executed which test the security of the web application. The results of the execution of the security test scripts 40 are then, evaluated to determine which vulnerabilities exist in the web application 50 and corrective action can then be taken to make the web application more secure.

Figure 2:
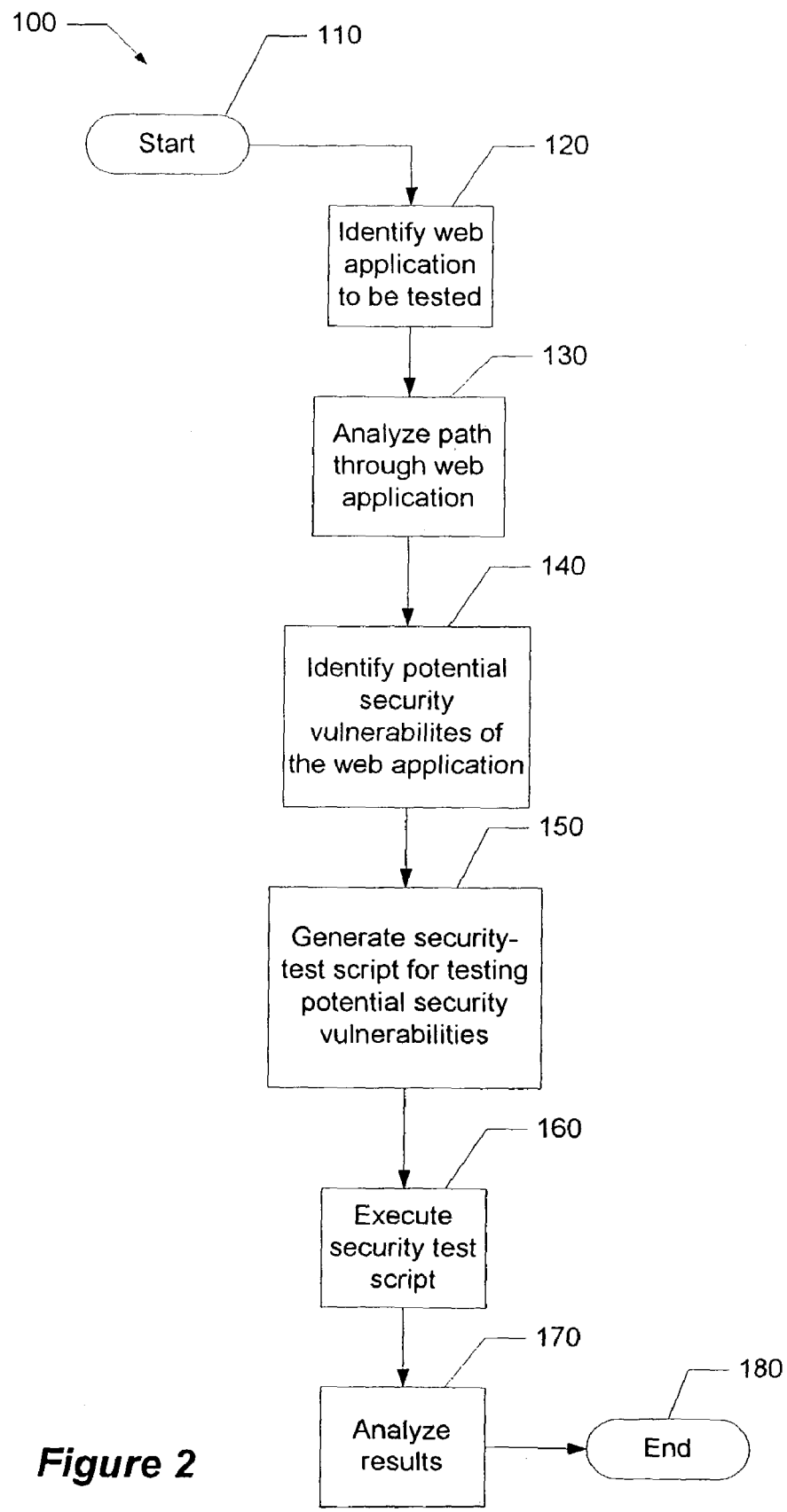
FIG. 2 is a flow chart of the method of the present invention.

A flow chart of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 100 begins at step 110. This step starts the process, and includes any preliminary tasks that need to be done such as initiating any parameters, or the like. Following step 110, step 120 is executed wherein the web application to be tested is identified. An example of a web application to be tested for vulnerability to security attacks may be a banking application wherein a user connects to the banks web site through a browser, access his or her account by entering a username/password combination and can determine an account balance. The example is a very simple one, used here to help describe the present invention. It should be appreciated that web applications are typically much more complex.

The next step to be executed is step 130 wherein the web application is analyzed. This is preferably done by using a functional test script that may have been previously generated. For the current example, a functional test script which accesses the bank web site, enters a user name and password combination, then navigates through the web application to check the account balance of the account associated with the username/password combination may have been previously used to verify the functionality of the web application. This step may also be performed manually, by a user using a browser to navigate through the website.

Following step 130, step 140 is executed. At step 140 potential security vulnerabilities of the web application are identified. In the simplified example used here, potential vulnerabilities may include easily guessed username/password combinations, cookie manipulation, session ID generation, and the like.

At step 150, one or more security tests are generated for testing each of the potential security vulnerabilities uncovered in step 140.

The security tests are executed at step 160. In accordance with the example web application being described, a first security test tries to login to the bank website using various username/password combinations. The username/password combinations are stored in a data bank associated with the security test. A second security test is run wherein a specific test script is run some number of times and the cookies from each session are logged. A third test is run wherein a specific test script is run some number of times and the session IDs from each session are logged and analyzed for simplistic session ID generation algorithms.

At step 170 the results of the security tests execution are analyzed. The login attempts performed by the first security test are analyzed to see if any of the attempts was successful, indicating that a certain account may be compromised. The log of the cookies generated during execution of the second security test is examined for plaintext information and for non-plaintext information such as encoding commonly available on Windows and UNIX platforms. This indicates that cookie data should be handled differently. The session IDs logged during the execution of the third security test are analyzed for simplistic session ID generation algorithms. A simple session ID generation algorithm can result in manipulation of session IDs by hackers attempting to gain access to a web applications data. Following step 170, the method ends at step 180.

The present invention provides security test generation for web applications. By way of the presently described invention tests which test the security of web applications are generated. These security tests are then run to test potential security vulnerabilities of the web application, and the results are analyzed to determine which vulnerabilities exist, such that corrective action can be taken to make the web application more secure from security attacks.

The above example used only a few security tests, however there are a large number of security tests that can be run on a web application and which can provide valuable information relating to how secure a web application is.

The following description includes several potential vulnerabilities that may be associated with a web application, and further describe how to test for the vulnerability.

A first vulnerability test area for web applications involves session management. One test for session management involves the use of simplistic Session IDs. Testing to determine simplistic session IDs involves running a specific test script some number of times. Between each iteration, all cookies, cache and other state are cleared. The session IDs from each session are logged. The log of session IDs is analyzed for simplistic session ID generation algorithms. The user is able to specify the number of iterations and the test scripts used to apply this security test. If the user specifies a databank of login/password pairs, that list is iterated through and repeated as necessary. In addition, all variants of this test use the login/password from the test script repetitively. The returned pages are examined for server and login errors; session IDs should not be logged if there are login errors.

Another session management test involves non-expiration of session IDs. A specific test script is run some number of times. Between each iteration, all cookies, cache and other state are cleared. The session ID from the first iteration is logged. When the server returns a new session ID, the session ID from the first iteration is substituted for the current session ID. The user is able to specify the number of attempts to reuse the session ID and how many times to iterate over the set (and thereby get a new session ID). The user is able to specify where unique session data resides in the script. The test will have been considered failed if the pages returned in any subsequent session contain the same data as in the first session (the server accepts the session ID and does not return a session expired error).

Another session management test involves the protection of session data. A specific test script is run some number of times concurrently. Each instance of the script will have its own cookies, cache and other state. The session ID from each instance is logged. The concurrent script instances rotate session IDs and attempt to access data in the other instance's session. The user is able to specify the number of concurrent instances of a script. The user is able to specify where unique session data resides in the script. The test will have been considered to fail if the data accessed by one instance can be accessed from any other instance of the script.

Still another session management security test involves cookie manipulation. A specific test script is run some number of times. Between each iteration, all cookies, cache and other state are cleared. The cookies from each session are logged. The log of cookies is examined for plaintext information. The user is able to specify the number of iterations and the test scripts which to apply this test. The log of cookies is examined for vulnerabilities such as uuencoded and rotX fields, and other encoding commonly available on UNIX and Windo provisional application Ser. No. 60/355,186 filed Feb. 7, 2002 ws platforms.

A second vulnerability test area for web applications involves authentication/access control. One test for authentication/access control involves the use of default account/ passwords. This test will examine a test script for any parameters which function as logins (which may have a set of common names). For each potential login found, it will generate a test script that uses an external databank that is pre-populated with account name/password pairs. The test will also parse fields found within comment fields in the HTML file to look for login password pairs. Anything found will be populated in the data bank. The user may edit the databank to specify additional accounts and passwords. The user may also specify some common algorithmic modifications of the databank entries, such as upper/lower case, reversal, and number postfixing.

Another test for authentication/access control involves the use of default scripts. This test will examine a test script for the potential location of any server-side scripts and attempt to test all those possible locations, in addition to default server install directories, for the existence of any standard scripts. For each script found, this test will attempt to exploit them using other known methods by generating derivative test scripts for each script/vulnerability pair. This test will report and log (for other tests) the results of its search. The user is able to specify the type of server that they are testing in order to narrow the potential scripts tried, and any directories which the user can specify to force a search.

Another test for authentication/access control involves the use of debug options on scripts. For each script found and logged (or just re-run that portion of previous test) and any parameters found in an input test script, the test will generate a script that submits standard post and debug queries/posts (such as ?debug=on). The user is able to augment the existing set of known default options.

A third vulnerability test area for web applications involves of input validation. One test for input validation involves buffer overflows. The test will examine a test script and locate all post and query parameters, and generate a separate test script for every parameter found. The value of the parameter is replaced with an extremely long string. The user is able to specify the length of the overflow string. The user may specify a long mode (one script per parameter) or a short mode (one script per test script web page).

A fourth vulnerability test area for web applications involves parameter tampering. One test for parameter tampering involves reordering parameters. The test script is analyzed, and for all instances where there are two or more post or query parameters, produce a test script which permutes the order of the parameters is produced, with a limit of permutations per parameter set. The user may change the permutation limit.

A second test for parameter tampering involves deleting parameters. The test script is analyzed, and for all instances where there are one or more post or query parameters, it will produce a set of test scripts which deletes one of the parameters at a time until there are none left, or the number of scripts equals the permutation limit (default 16). The user may change the permutation limit.

A third test for parameter tampering involves adding parameters. The test script is analyzed, and for all instances where there are post or query parameters, it will generate a test script where there is a new parameter inserted at the beginning of the post or query string. The user may specify the name and value of the new parameter.

A fifth vulnerability test area for web applications involves hidden parameter manipulation. A first test for hidden parameter manipulation involves changing parameter values. The test will take an input script, and for every parameter found, will generate a script that changes the value of that parameter. The test will fail if the value is found to have changed on the resultant HTML page. The user specifies data on an HTML page which is tied to the parameter.

A second test for hidden parameter involves manipulating JavaScript™ parameters. The test will look for URLs embedded in JavaScript and perform the same parameter manipulations in the URLs as standard parameter tampering.

A sixth vulnerability test for web applications involves script tampering. A first test for script tampering involves script corruption. The test script is analyzed for the presence of SQL query strings that are in hidden parameters or post actions.

Another test for script tampering includes the cross-site scripting. The test script is analyzed for the presence of form input fields that are posted to the server. It will generate a set of test scripts for every form input field that contains embedded script code and examine the return pages to look for the presence of the same script code.

Another vulnerability test area for web applications involves file/application enumeration. A first test for file/ application enumeration includes directory indexing. The test will take as an input a test script file. For every directory found in the input, it will produce a page in a test script to see if directory indexing is turned on and there are no index.html files. If the script is able to find a directory auto index, the script will produce a warning for every directory that is indexable.

A second test for file/application enumeration includes access control fault testing. The test will take as an input a test script file. The script is examined for potential login places, and generates a new test script which eliminates the login page and attempts to navigate directly to subsequent pages. The test will pass if the server does not allow this navigation to occur. The user is able to specify the page at which the login to privileged information occurs, and which pages are supposed to be protected.

A third test for file/application enumeration includes mirror directories. The test will take as an input a test script file. For every directory found in the input, it will produce a page in a test script to see if hidden mirror directory names exist in that directory. There will be a set of common hidden directory names. If the script is able to find that a hidden directory exists, the script will produce a warning for every hidden directory that is found. The user is able to specify the names of hidden directories to search for.

A fourth test for file/application enumeration includes backup files. The test takes as an input a test script file. For every page found or linked to in the input script, it will produce a page in a test script to see if hidden backup copy of that page exists in that directory. There will be a set of common backup file postfixes. If the script is able to find that a hidden backup file exists, the script will produce a warning for every hidden backup file that is found. The user is able to specify the names of hidden backup file postfixes.

A fifth test for file/application enumeration includes common files. The test takes as an input a test script file. For every directory found in the input, it will produce a page in a test script to see if hidden files corresponding to files automatically generated by common applications exist in that directory. There will be a set of common application file names. If the script is able to find that a hidden file exists, the script will produce a warning for every hidden file that is found. The user is able to specify the names of hidden files to search for.

A sixth test for file/application enumeration includes unprotected web traversal. This test will try to navigate to directories outside of the web file structure.

A method of providing security test script generation has been described. The method analyzes a web application for potential vulnerabilities. Once the potential vulnerabilities are identified, the present invention generates one or more security tests to test for all the potential vulnerabilities identified. The results of security test script execution are then analyzed to determine if potential vulnerability in fact exists, such that the web application can be modified to remove the security vulnerability.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of security testing a web application comprising:
   identifying a web application to be tested;
   generating one or more functional test scripts that are configured to access the web application and to simulate user interaction with the web application;
   executing the one or more functional test scripts on the web application and storing responses from the web application;
   identifying potential security vulnerabilities of the web application based at least in part on the stored responses, wherein said potential security vulnerabilities include session management vulnerability, and authentication/access control vulnerability;
   generating at least one security test script based at least in part from the functional test scripts, where the security test script tests said potential vulnerabilities;
   executing said security test script on said web application;
   logging session identifiers obtained during the execution of the security test script and determining whether the session identifiers are secure;
   analyzing results of said executing said security test script; and
   using the results of said executing said security test script to modify and provide increased security of said web application.

2. The method of claim 1 wherein said identifying potential security vulnerabilities includes analyzing a path through the web application.

3. The method of claim 1 wherein said web application comprises one or more web pages.

4. The method of claim 1 wherein said potential security vulnerabilities further comprises cookie manipulation.

5. The method of claim 1 wherein said potential security vulnerabilities further comprises default accounts/passwords.

6. The method of claim 1 wherein said potential security vulnerabilities further comprises input validation vulnerability that includes determining buffer overflow.

7. The method of claim 1 wherein said potential security vulnerabilities further comprises parameter tampering vulnerability that includes reordering parameters, deleting parameters and adding parameters.

8. The method of claim 1 wherein said potential security vulnerabilities further comprises hidden parameter manipulation vulnerability that includes changing parameters manipulating parameters, and manipulating script parameters.

9. The method of claim 1 wherein said potential security vulnerabilities further comprises script corruption.

10. The method of claim 1 wherein said potential security vulnerabilities further comprises file/application enumeration vulnerability further which comprises directory indexing and backup files.

11. A non-transitory computer-readable medium storing computer executable instructions, comprising:
    instructions for identifying a web application to be tested;
    instructions for generating one or more functional test scripts that are configured to access the web application and to simulate user interaction with the web application;
    instructions for executing the one or more functional test scripts on the web application and storing responses from the web application;
    instructions for identifying potential security vulnerabilities of the web application based at least in part on the stored responses, wherein said potential security vulnerabilities include session management vulnerability, and authentication/access control vulnerability
    instructions for generating at least one security test script based at least in part from the functional test scripts, where the security test script tests said potential vulnerabilities;
    instructions for executing said security test script on said web application;
    instructions for logging session identifiers obtained during the execution of the security test script and determining whether the session identifiers are secure;
    instructions for analyzing results of said executing said security test script; and
    instructions for using the results of said executing said security test script to provide increased security of said web application.

12. The non-transitory computer-readable medium of claim 11 wherein said instructions for identifying potential security vulnerabilities includes instructions for analyzing a path through the web application.

13. The non-transitory computer-readable medium of claim 11 wherein said web application comprises one or more web pages.

14. The non-transitory computer-readable medium of claim 11 wherein said potential security vulnerabilities further comprises cookie manipulation.

15. The non-transitory computer-readable medium of claim 11 wherein said potential security vulnerabilities further comprises default accounts/passwords.

16. The non-transitory computer-readable medium of claim 11 wherein said potential security vulnerabilities includes input validation vulnerability which includes determining buffer overflow.

17. The non-transitory computer-readable medium of claim 11 wherein said potential security vulnerabilities further comprises parameter tampering vulnerability that includes reordering parameters, deleting parameters and adding parameters.

18. The non-transitory computer-readable medium of claim 11 wherein said potential security vulnerabilities further comprises hidden parameter manipulation vulnerability that includes changing parameters, manipulating parameters, and manipulating script parameters.

19. The non-transitory computer-readable medium of claim 11 wherein said potential security vulnerabilities further comprises script corruption.

20. The non-transitory computer-readable medium of claim 11 wherein said potential security vulnerabilities further comprises file/application enumeration vulnerability which comprises directory indexing and backup files.

* * * * *

UNITED STATES PATENT AND TRADEMARK OFFICE
CERTIFICATE OF CORRECTION

PATENT NO. : 7,975,296 B2
APPLICATION NO. : 10/360572
DATED : July 5, 2011
INVENTOR(S) : Apfelbaum et al.

It is certified that error appears in the above-identified patent and that said Letters Patent is hereby corrected as shown below:

Title page, in column 1, under "Assignee", line 2, after "Redwood Shores" insert -- CA (US) --.

On sheet 2 of 2, in figure 2, Box No. 140, line 3, delete "vulnerabilites" and insert -- vulnerabilities --, therefor.

In column 1, line 29, delete "he" and insert -- the --, therefor.

In column 2, line 16, delete "application.. the" and insert -- application. The --, therefor.

In column 2, line 18, delete "attacks.." and insert -- attacks. --, therefor.

In column 3, line 48, delete "usemame/password" and insert -- username/password --, therefor.

In column 3, line 64, delete "usemame/password" and insert -- username/password --, therefor.

In column 3, line 64, delete "usemame/password" and insert -- username/password --, therefor.

Signed and Sealed this
Fifteenth Day of November, 2011

David J. Kappos
*Director of the United States Patent and Trademark Office*